UNITED STATES PATENT OFFICE.

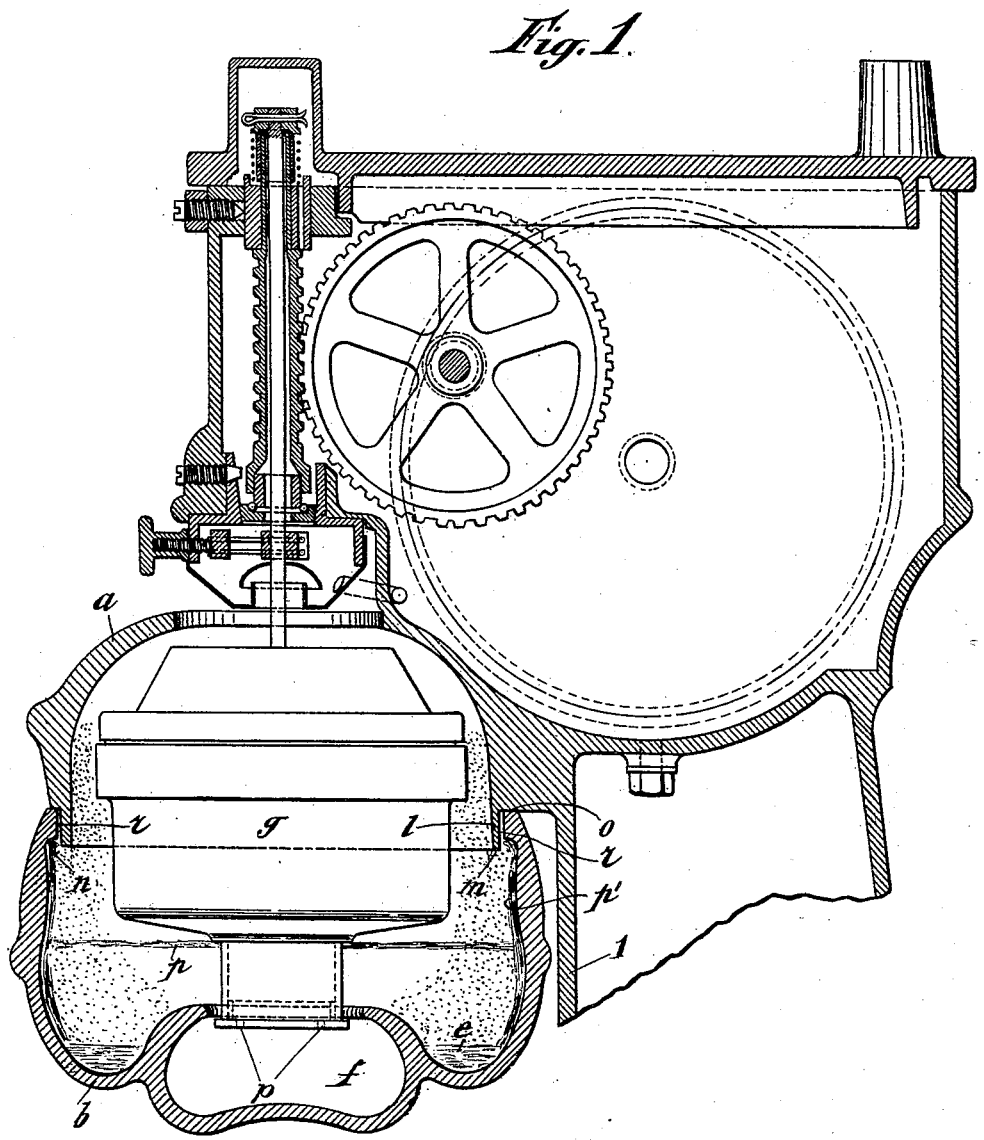

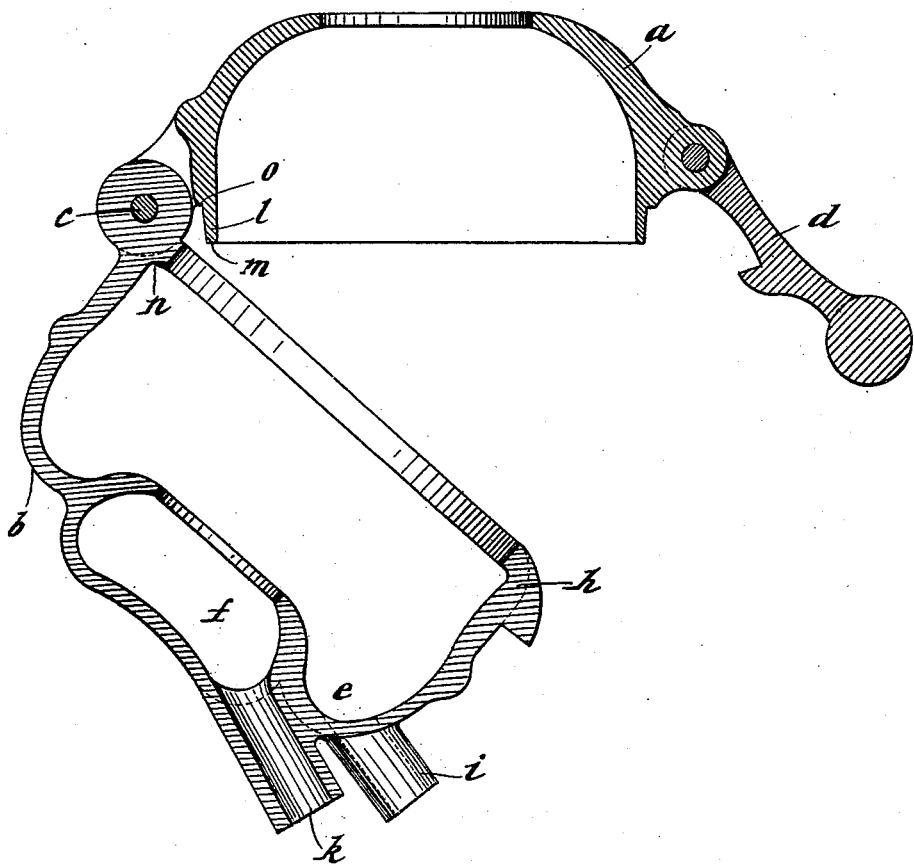

JULES PERSOONS AND ALPHONSE PERSOONS, OF CHILDONCK, BELGIUM.

COLLECTING-CASING FOR CREAM-SEPARATORS.

969,400. Specification of Letters Patent. Patented Sept. 6, 1910.

Original application filed November 16, 1905, Serial No. 287,598. Divided and this application filed October 28, 1909. Serial No. 525,221.

*To all whom it may concern:*

Be it known that we, JULES PERSOONS and ALPHONSE PERSOONS, both manufacturers and subjects of the King of Belgium, residing at Childonck, in the Kingdom of Belgium, have invented new and useful improvements in Collecting-Casings for Cream-Separators, of which the following is a specification.

In our prior application Serial No. 287,598 filed Nov. 16, 1905 (which eventuated in Patent No. 946,985, granted Jan. 18, 1910) we have disclosed several improvements in the construction of cream separators. The present application is a division of said prior application Serial No. 287,598, and it pertains, more particularly, to the construction of the collecting casing.

This invention is an improvement in that class of collecting casings in which the casing is composed of two parts connected horizontally and in which also the skimmed milk, escaping from the drum, is projected against the wall of the casing by the centrifugal force in such a manner that it can reach the horizontal separating joint between the two parts of the casing.

Our invention has for its purpose to provide an improved construction of said casings in which any leakage of the milk projected against the wall is avoided and a perfect hermetical closure of the casing is secured without necessitating the use of any elastic material between the parts of the casing and, with this object in view, our invention essentially consists in a special arrangement of the coöperating parts of the casing as will be hereinafter fully described.

Referring to the annexed drawings: Figure 1 is a vertical section of a collecting casing, showing the drum of the milk separator, placed therein. Fig. 2 is a similar section of the casing, taken at right angle with regard to Fig. 1, showing the casing in an open condition.

The casing consists of an upper part $a$ and a lower part $b$. The upper part $a$, as shown in Fig. 1, can be in one piece with the frame 1 of the separator. In the lower part $b$ two collecting chambers $e$ and $f$ are provided in which the skimmed milk and the cream are respectively collected when they are discharged from the drum $g$. The part $b$ is connected by a hinge-joint $c$ with the upper part $a$ of the casing and the latter is provided with a hook or lever $d$ engaging a catch or projection $h$ on the lower movable part in such a manner that the collecting casing can be readily opened horizontally. Both chambers $e$ and $f$ are provided with discharge openings $i$ and $k$, see Fig. 2.

According to our invention, in order to secure a tight joint between the upper part $a$ of the casing and the lower part $b$, without necessitating the use of any elastic or packing material between said parts, the upper part $a$ is provided or formed integral with a downwardly projecting ring $l$ extending into the lower part $b$ in such a manner that the edge $m$ of said ring is situated somewhat lower than a horizontal and inwardly projecting flange $n$ forming the joint surface of the lower part $b$ contacting with the horizontal edge $o$ of the upper part $a$ of the casing. The projecting ring $l$ coöperates with the flange $n$ in the following way in order to secure the tightness of the closure of the collecting device: The skimmed milk leaving the drum $g$ is projected by centrifugal force against the wall of the lower part $b$ of the casing at about mid-way of said casing as shown at $p$ and said milk is led, owing to the breaking of the jet, in every direction. A part of said milk is projected upwardly along the wall of the part $b$ as shown at $p^1$ and would escape through the joint between the two parts of the casing if its further ascending movement were not prevented by the inwardly projecting flange $n$. On the other hand, on account of the great speed of revolution of the drum $g$, which is usual in cream separators, a part of the skimmed milk issuing from the drum $g$ is transformed, when it strikes upon the wall of the casing, in an infinitely great number of small drops filling the casing with a thick fog; said fog condensing on the wall of the upper part $a$ of the casing, drops are formed which flow downwardly along the wall of the upper part $a$ and which are prevented, by the downwardly projecting ring $l$, from reaching the joint $o$. The milk flows along said ring and finally drops off at its lower edge in the lower part $b$ of the collecting casing. It will be understood that, owing to the coöperation of the ring $l$ with the inwardly projecting flange $n$, the skimmed milk projected in the collecting casing can neither enter the space $r$ formed between the ring $l$ and the flange $n$, nor reach the separating joint $o$ of the two parts of the casing. The cream is discharged from the lower part of the drum through apertures, $p$, which apertures are provided in the lower end of said drum, as shown in dotted lines in Fig. 1, said apertures permitting the cream to escape from the drum directly into the chamber, $f$.

Having thus described our invention, what we claim is:

1. In a collecting casing for cream separators, the combination of an upper part, a lower movable part, said lower part being pivoted horizontally to the upper part, means for holding the lower part in a closed condition with relation to the upper part and means for preventing the skimmed milk from reaching the joint between the upper and the lower parts of the casing.

2. In a collecting casing for cream separators, the combination of an upper part, a lower movable part, said lower part being pivoted horizontally to the upper part, means for holding the lower part in a closed condition with relation to the upper part, means for preventing the skimmed milk from reaching the joint between the upper and the lower parts of the casing when projected against the wall of the lower part and means for conducting drops of skimmed milk from the upper part of the casing into the lower part without reaching the joint between said parts.

3. In a collecting casing for cream separators, the combination of an upper part, a lower part, means for holding the upper part and the lower part in a closed condition, a downwardly projecting ring formed on the upper part and a horizontal inwardly projecting flange formed on the lower part, said ring and flange coöperating to secure a tight joint between the two parts of the casing.

4. A collecting casing for cream separators comprising an upper part, a lower part movable with respect to the upper part, and coöperating flanges on the respective parts, said flange on the upper part fitting within the flange on the lower part when the casing is closed, the line of juncture of said flanges being in a vertical plane intermediate the planes of the walls of said parts, whereby leakage of the liquid is precluded through the meeting flanges and a packing between the respective parts is obviated.

5. In a collecting casing for cream separators, an upper part having a depending flange, a lower part provided with an inwardly extending flange, and means connecting said parts and permitting one part to move relative to the other, said flange of the upper part fitting within the flange of the lower part and the opposing faces of the two said flanges meeting in a plane intermediate the respective inner surfaces of the walls comprising said parts, whereby leakage of the liquid is precluded through the joint and a packing between the parts is obviated.

In testimony whereof we have signed our names to this specification in the presence of two subscribing witnesses.

JULES PERSOONS.
ALPHONSE PERSOONS.

Witnesses:
JACQUE BEDE,
GREGORY PHELAN.